(12) United States Patent
Usuda et al.

(10) Patent No.: US 7,225,101 B2
(45) Date of Patent: May 29, 2007

(54) ELECTRONIC DEVICE, SIGNAL COMPENSATION DEVICE AND SIGNAL COMPENSATION METHOD

(75) Inventors: Hiroshi Usuda, Tokyo (JP); Eiji Miyazaki, Tokyo (JP); Shinji Yamachika, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/493,403

(22) PCT Filed: Aug. 22, 2003

(86) PCT No.: PCT/JP03/10633

§ 371 (c)(1),
(2), (4) Date: Oct. 22, 2004

(87) PCT Pub. No.: WO2004/020945

PCT Pub. Date: Mar. 11, 2004

(65) Prior Publication Data

US 2005/0071118 A1     Mar. 31, 2005

(30) Foreign Application Priority Data

Aug. 28, 2002  (JP) ............................. 2002-249795
Sep. 19, 2002  (JP) ............................. 2002-274156

(51) Int. Cl.
*G01C 19/00*  (2006.01)
*G01P 21/00*  (2006.01)
*G01P 9/00*   (2006.01)
*G01P 13/00*  (2006.01)
*G09G 5/00*   (2006.01)

(52) U.S. Cl. ................ 702/141; 73/504.16; 73/504.12; 73/504.14; 73/504.15; 310/316.01

(58) Field of Classification Search ................ 702/141
See application file for complete search history.

(56) References Cited

U.S. PATENT DOCUMENTS 6,116,087 A * 9/2000 Asami et al. ............ 73/504.16

FOREIGN PATENT DOCUMENTS

| JP | 6-66568 A1 | 3/1994 |
| JP | 06-66568 | * 8/1994 |
| JP | 2000-65576 A | * 3/2000 |
| JP | 2000-65576 A1 | 3/2000 |
| JP | 2002-7027 A1 | 1/2002 |
| JP | 2002-7027 | * 11/2002 |

* cited by examiner

*Primary Examiner*—John Barlow
*Assistant Examiner*—Sujoy Kundu
(74) *Attorney, Agent, or Firm*—Lerner, David, Littenberg, Krumholz & Mentlik, LLP

(57) ABSTRACT

An electronic device that prevents a failure caused by a temperature drift of an angular velocity sensor, and a signal compensation system and a signal compensation method for compensating for the temperature drift are provided. The present invention provides a mechanism including an angular velocity sensor that outputs a first signal in accordance with a rotational angular velocity. The device stores in advance data of a second signal normally output by the angular velocity sensor while in a stationary state, detects a stationary state and extracts the difference between the first and second signals when the stationary state is detected. The device thereby compensates for the first signal based on the extracted difference signal. A display unit in the device scrolls an image based on the compensated signal. This prevents a failure caused by the temperature drift of the angular velocity sensor.

8 Claims, 12 Drawing Sheets

$$\begin{cases} \circ\ \varDelta = \theta - \beta 1 \\ \circ\ \omega = \alpha 1 + \varDelta \\ \qquad = \alpha 1 - \beta 1 + \theta \end{cases}$$

ELECTRONIC DEVICE, SIGNAL COMPENSATION DEVICE AND SIGNAL COMPENSATION METHOD

TECHNICAL FIELD

The present invention relates to an electronic device, for example, a portable terminal, a cellular phone, or the like, and to a signal compensation device installed in such a device and a signal compensation method used for such a device.

BACKGROUND ART

Japanese Unexamined Patent Application Publication No. 2002-7027 discloses a technique for scrolling an image displayed on a display unit in response to movement of a housing of a portable device such as a portable terminal or a cellular phone. For example, when a user who holds such a device in his/her hand moves the device to the right, the image is also scrolled to the right. An angular velocity sensor is used as equipment for sensing movement of the housing. For example, a reference value of the angular velocity sensor is determined, and the change from the reference value is output as an electrical signal. Then, a screen is scrolled according to the output result.

However, an angular velocity sensor for use in such a device changes the reference value upon a change in the ambient temperature, that is, a so-called temperature drift occurs. The temperature drift is output as low-frequency variations, and affects image scrolling. This can cause, for example, a failure that the image displayed on a display unit is automatically scrolled even when a user does not move the device or the screen is scrolled in the direction different from the direction in which the user moves the device.

The present invention has been made in view of such situations, and it is an object of the present invention to provide an electronic device, a signal compensation device, and a signal compensation method that prevent a failure caused by a temperature drift of an angular velocity sensor.

DISCLOSURE OF INVENTION

In order to overcome the foregoing problem, in a primary aspect of the present invention, an electronic device includes an angular velocity sensor that outputs a first signal in accordance with a rotational angular velocity, means for storing in advance data of a second signal normally output by the angular velocity sensor that is in a stationary state, means for detecting a stationary state, means for extracting the difference between the first signal and the second signal when the stationary state is detected, means for compensating for the first signal based on the extracted difference signal, and a display unit that scrolls and displays an image based on the compensated signal.

The human arm moves around a pivot point at the elbow or shoulder. The motion of a user who moves a housing in a space is close to a spherical motion. In order to detect the velocity of the arm movement, it is only required to detect the velocity of spherical motion, i.e., the angular velocity, of the arm.

In general, the relation between acceleration and velocity is given by Eq. 1 as follows:

$$\text{acceleration} \alpha = \frac{\text{velocity} V}{dt}, \text{velocity} V = \sum_{i=0}^{t} \alpha i \text{ (acceleration)} \qquad \text{Eq. 1}$$

As is found from Eq. 1, an acceleration sensor can determine the velocity by integrating the data obtained at a given time width t. Once the velocity of a moving object for a constant period of time is determined, the moving distance is further determined by integrating the value of the determined velocity. The amount of scrolling is therefore determined.

However, a double integral by means of time needs to be calculated in order to determine the moving distance of the moving object from the acceleration, possibly resulting in response delay or accumulated error. Moreover, the acceleration sensor is more susceptible to the acceleration of gravity than the angular velocity sensor, and this can cause an error. As described above, it is only required to detect the angular velocity in order to detect the arm movement. In the present invention, therefore, the angular velocity sensor is used as means for detecting the amount of movement.

The amount of scrolling is given by Eq. 2 using the angular velocity:

$$\text{scrolling amount } L = \sum_{i=0}^{t} \omega i (\text{angular velocity}) \qquad \text{Eq. 2}$$

The angular velocity sensor is primarily used to detect vibration caused by the shaking of the hand holding electronic equipment. The vibration caused by shaking exhibits short-wavelength high-frequency variations. When the vibration caused by shaking is to be detected, for example, a high-pass filter or the like is used to remove the low-frequency variations to output only the high-frequency variations. The temperature drift outputs low-frequency variations, and such variations are thus removed. Therefore, in detecting the vibration caused by shaking, the failure issue due to the temperature drift does not occur.

The detection operation of the angular velocity sensor according to the present invention corresponds to the user operation of moving the device while visually monitoring the display unit, and exhibits low-frequency variations of long wavelength. The operation of moving the device is correlated to low-frequency variations due to the temperature drift.

According to the present invention, comparison to the output of the angular velocity sensor when the device is in a stationary state allows for extraction of the value of the temperature drift. Based on this value, the output of the angular velocity sensor can be compensated for.

In the present invention, the output of the angular velocity sensor of the device in the stationary state at a given temperature is stored in advance. For example, the output of the angular velocity sensor of the device in the stationary state at a different temperature is detected. The detected output is compared to the previously stored output of the angular velocity sensor, and the difference in the reference value that changes due to the temperature drift is extracted. The output of the angular velocity sensor in a moving state of the device equals the sum of the output as a result of the movement and the output as a result of the temperature drift. The extracted difference in the reference value is equivalent to the output as a result of the temperature drift. Therefore, by removing the extracted difference in the reference value from the output of the angular velocity sensor in the moving state of the device, only the output as a result of the movement can be determined. Where the angular velocity for the drift is indicated by $\Delta\omega k$, the amount of scrolling after the correction is given by Eq. 3:

$$\text{compensated scrolling amount } L = \sum_{i=0}^{t} \{\omega i - \Delta\omega k\} \quad \text{Eq. 3}$$

Therefore, a failure that the image displayed on the display unit is automatically scrolled due to the temperature drift of the angular velocity sensor does not occur.

In the electronic device, preferably, the stationary-state detecting means is an acceleration sensor that is used to detect a velocity component and a displacement component in a predetermined direction of the electronic device.

Generally, the angular velocity sensor is not sufficiently sensitive to linear motion. On the other hand, the acceleration sensor is capable of detecting the acceleration of movement during linear motion. Due to the suitability for detection of the absolute movement, the acceleration sensor is able to detect linear movement of the device and is also able to detect the stationary state in which the device does not move. Thus, no additional sensor is required for detecting the stationary state, and the complexity of a processing system does not increase, resulting in efficient processing.

On the other hand, the angular velocity sensor is suitable for detection of the relative movement, and is thus able to detect the amount of hand and arm movement. In a case where the acceleration sensor is mainly used, the response is low and the accumulated error in the integration is large, compared to a case where the angular velocity sensor is mainly used. However, only the linear motion, which is not sufficiently detected by the angular velocity sensor, is detected by the acceleration sensor, thus preventing such a low response and low scrolling response. In the present invention, the acceleration sensor is used as an auxiliary sensor to the angular velocity sensor. Thus, sufficient sensitivity to linear motion is achievable, and movement of the device is more reliably detectable.

An electronic device in another aspect of the present invention includes an angular velocity sensor that outputs a first signal in accordance with a rotational angular velocity, means for storing in advance data of a second signal normally output by the angular velocity sensor that is in a stationary state, a button, means for extracting the difference between the first signal and the second signal when the button is pressed, means for compensating for the first signal based on the extracted difference signal, and a display unit that scrolls and displays an image based on the compensated signal.

With this structure, a user is allowed to perform compensation, as desired, by pressing a button disposed on the electronic device in the stationary state. This prevents a failure of the device.

The present invention is not limited to an electronic device. The present invention is widely applicable to a signal compensation device, and can also be appreciated as a signal compensation method.

Specifically, a signal compensation device in still another aspect of the present invention includes an angular velocity sensor that outputs a first signal in accordance with a rotational angular velocity, means for storing in advance a second signal normally output by the angular velocity sensor that is in a stationary state, means for detecting a stationary state, means for extracting the difference between the first signal and the second signal when the stationary state is detected, and means for compensating for the first signal based on the extracted difference signal.

A signal compensation device in still another aspect of the present invention includes an angular velocity sensor that outputs a first signal in accordance with a rotational angular velocity, means for storing in advance data of a second signal normally output by the angular velocity sensor that is in a stationary state, a button, means for extracting the difference between the first signal and the second signal when the button is pressed, and means for compensating for the first signal based on the extracted difference signal.

A signal compensation method in still another aspect of the present invention includes a step of detecting a stationary state, a step of reading a first signal output from an angular velocity sensor, a step of reading data of a second signal from a storage medium, the data of the second signal being normally output by the angular velocity sensor that is in a stationary state, a step of extracting the difference between the read first signal and second signal when the stationary state is detected, and a step of compensating for the first signal based on the extracted difference signal.

BEST MODE FOR CARRYING OUT THE INVENTION

An embodiment of the present invention will be described hereinbelow with reference to the drawings.

(Display Device)

An electronic device according to the present invention will be described with reference to FIGS. 1 and 2 in the context of a display device, by way of example.

Figure 1:
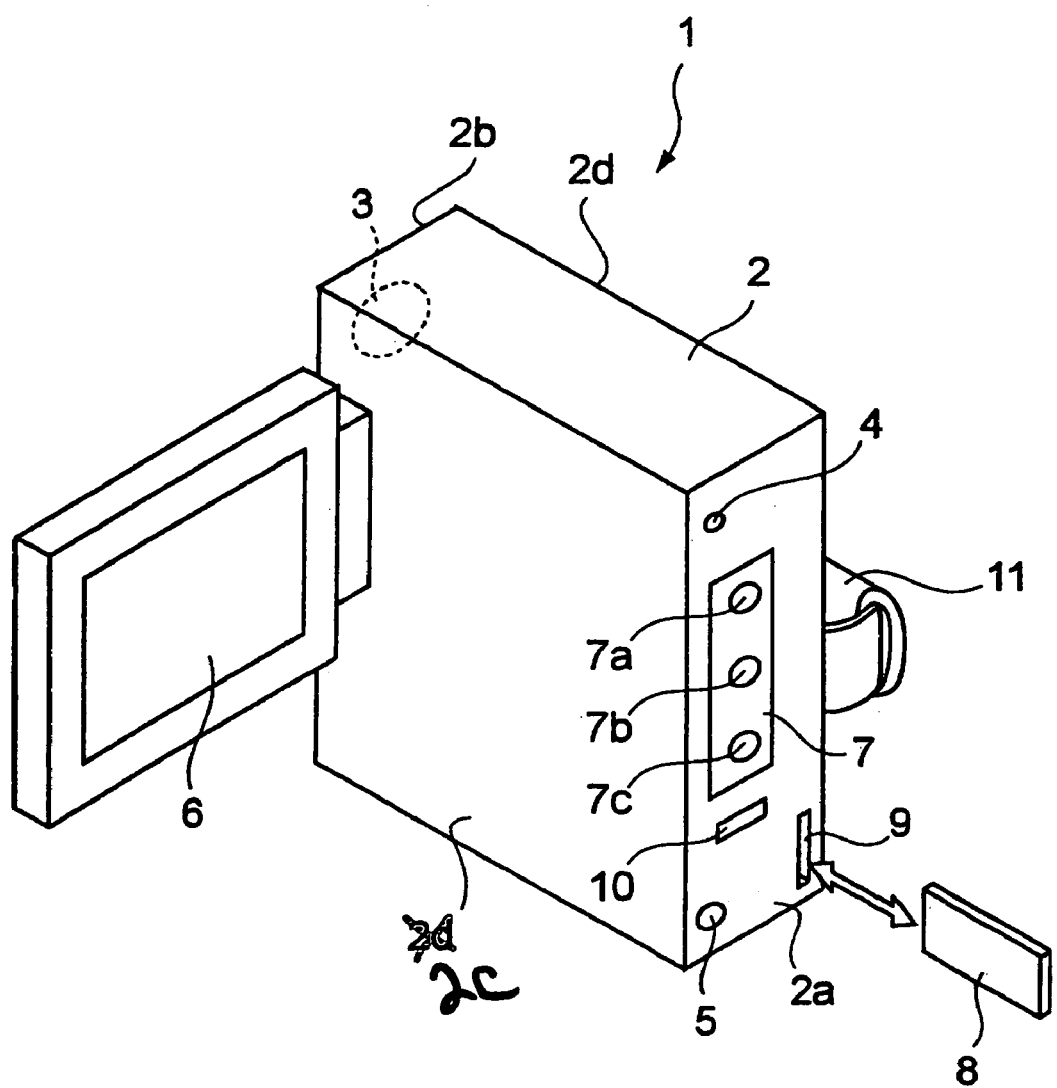
FIG. 1 is a perspective view showing the appearance of a display device according to an embodiment of the present invention.

FIG. 1 is a perspective view of an electronic device according to an embodiment of the present invention. FIG. 2 is a block diagram showing hardware configuration of the display device.

As shown in FIG. 1, a display device 1 has a housing 2 that is sized, for example, so as to be held by a user in his/her hand.

A speaker 4, a microphone 5, and a reset button 10 are disposed on a front surface 2a of the housing 2. An operation unit 7 having an OK button 7a, an undo button 7b, and a camera capture button 7c, and a mounting unit 9 to which, for example, a stick-type storage medium 8 is removably inserted are further disposed on the front surface 2a.

A camera 3 is disposed on a back surface 2b of the housing 2. The camera 3 is, for example, a CCD camera.

A display unit 6 is disposed on a side surface 2c of the housing 2. The display unit 6 is, for example, a color liquid crystal display device. A handle 11 is disposed on a side surface 2d of the housing 2.

Figure 2:
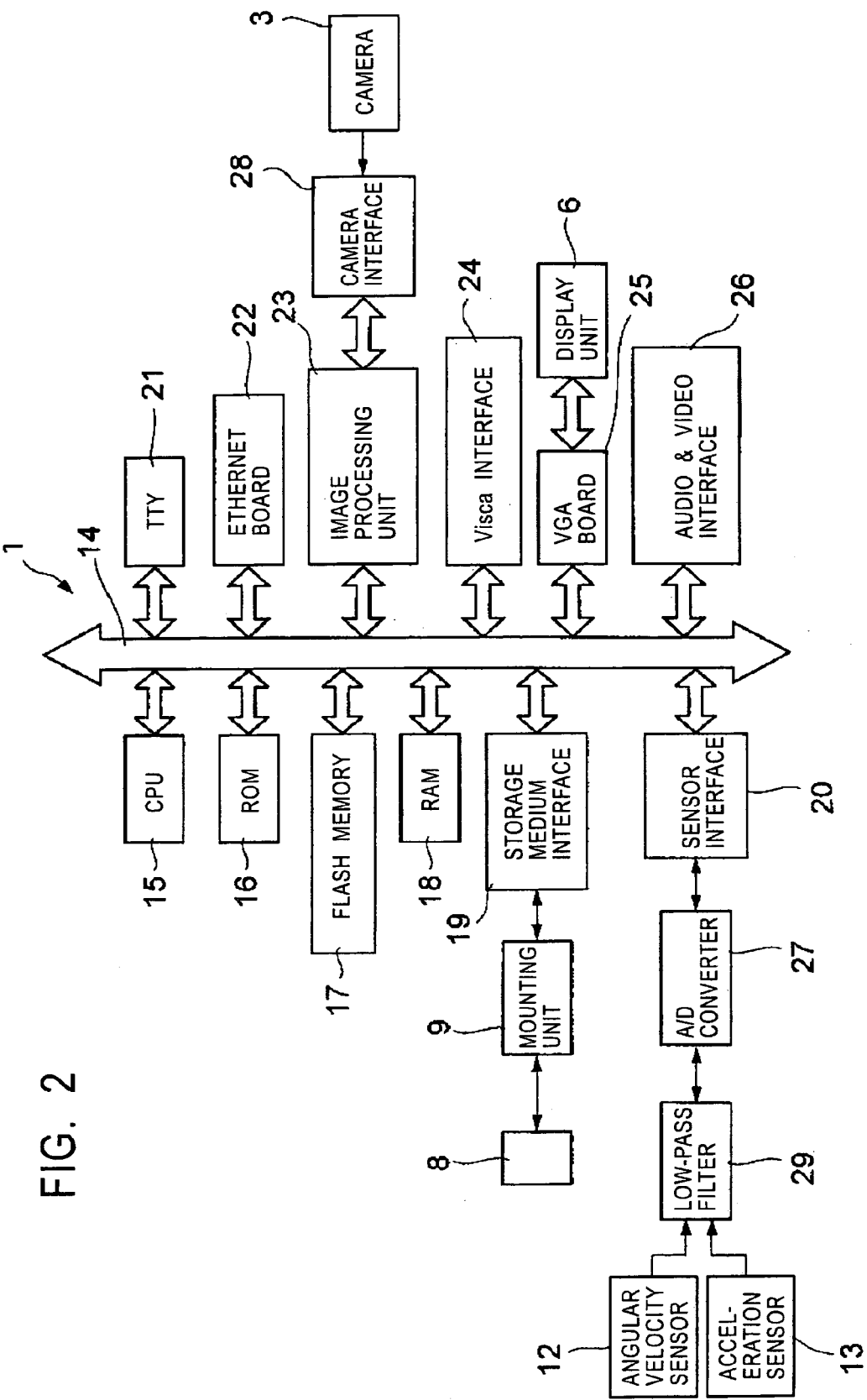
FIG. 2 is a block diagram showing hardware configuration of the display device according to the embodiment.

As shown in FIG. 2, the display device 1 is configured such that a CPU 15, a ROM 16, a flash memory 17, a RAM 18, a storage medium interface 19, a sensor interface 20, and other various interfaces including, for example, a TTY (Tele Typewriter) 21, an NIC (network interface card), for example, an Ethernet (registered trademark) board 22, an image processing unit 23, a Visca interface 24, a VGA board 25, and an audio & video interface 26 are connected to a main bus 14. The CPU 15 collectively controls the overall display device 1. The ROM 16 is used to store programs necessary for the operation of the CPU 15. The necessary programs include, for example, a program for a changeover switch, as described below. The flash memory 17 is used to store necessary data. The necessary data includes output data of an angular velocity sensor at a given temperature, as described below. The RAM 18 is used as a work space for processing.

The storage medium interface 19 is connected with the mounting unit 9. Data is communicated with the storage medium 8 inserted in the mounting unit 9.

The sensor interface 20 is connected in parallel to an angular velocity sensor 12 and an acceleration sensor 13 via an A/D converter 27 and a low-pass filter 29.

The TTY (Tele Typewriter) 21 is connected with the various buttons in the operation area described above.

The Ethernet board 22 allows for connection to the Ethernet. This allows for connection to, for example, a server via the Ethernet, and further allows for connection to the Internet via this server.

The image processing unit 23 is connected with a camera interface 28. The camera interface 28 is connected with the CCD camera 3 described above. An image connected by the CCD camera 3 can be captured in the display device 1, and can also be displayed on the display unit 6.

The Visca interface 24 is connected with an external personal computer, and so forth. Various control operations of the display device 1 can be performed via this interface.

The VGA board 25 is connected with a liquid crystal display device serving as the display unit 6.

The audio & video interface 26 is connected with audio and video equipment. Via the audio & video interface 26, a signal from such audio and video equipment can be captured in the display device 1, or, conversely, an audio signal or a video signal can be output.

(Angular Velocity Sensor and Acceleration Sensor)

The angular velocity sensor and acceleration sensor disposed in the display device 1 will now be described with reference to FIGS. 3A through 6.

Figure 3A:
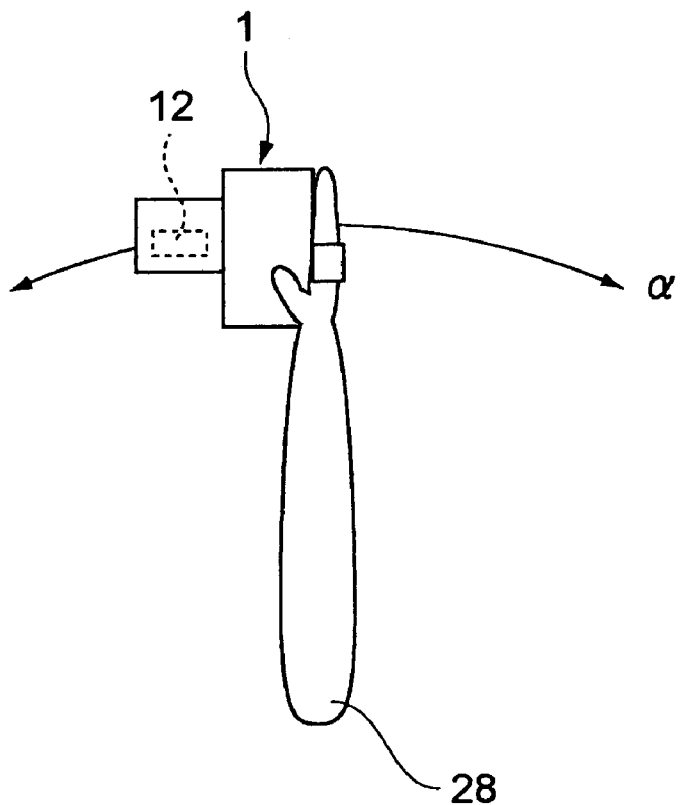
FIGS. 3A and 3B are perspective views of an angular velocity sensor for use in the display device according to the embodiment.
Figure 3B:
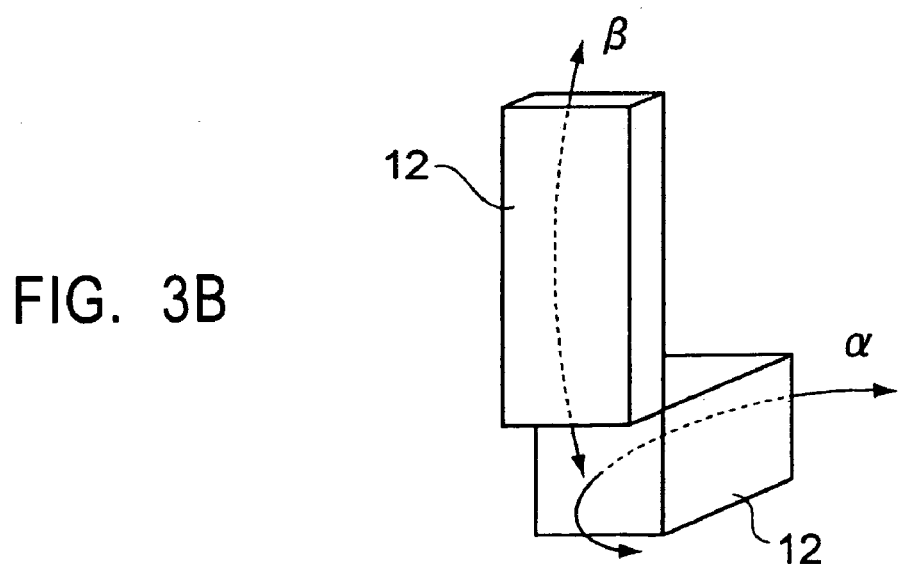
Figure 4A:
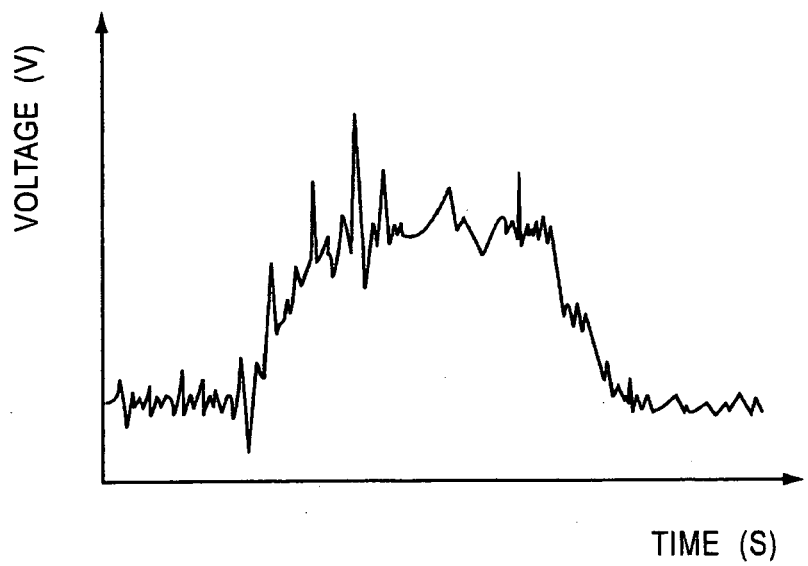
FIGS. 4A and 4B are output graphs of the angular velocity sensor for use in the display device according to the embodiment.
Figure 4B:
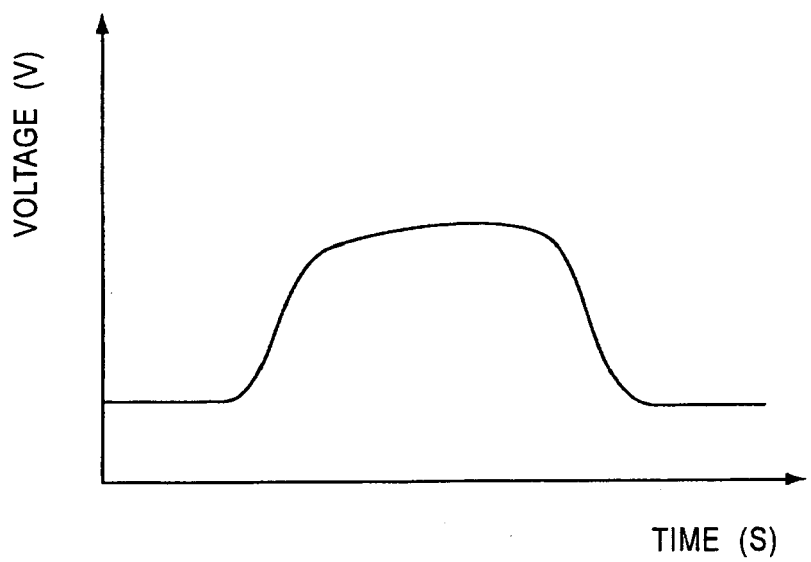
Figure 5:
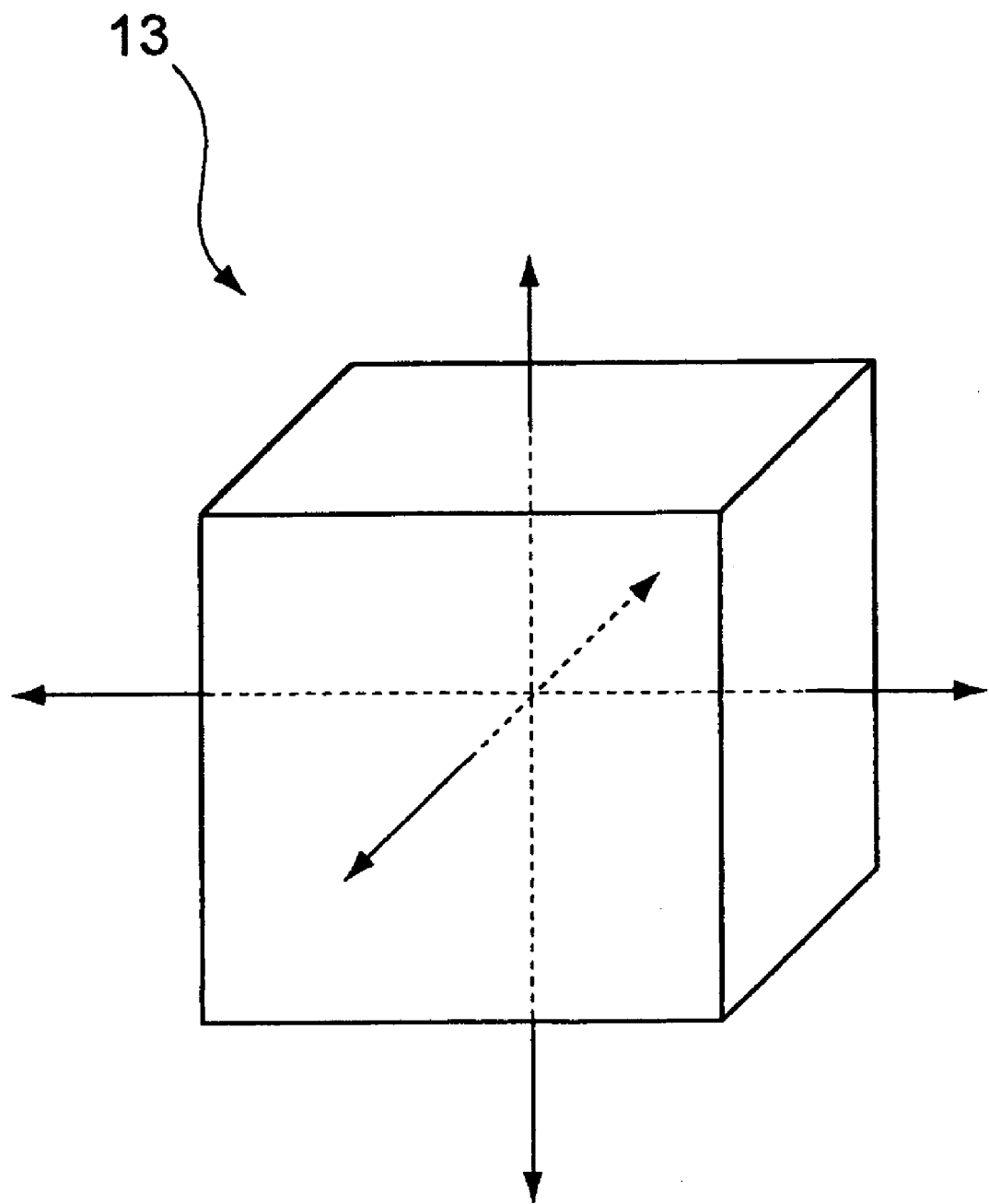
FIG. 5 is a perspective view of an acceleration sensor for use in the display device according to the embodiment.
Figure 6:
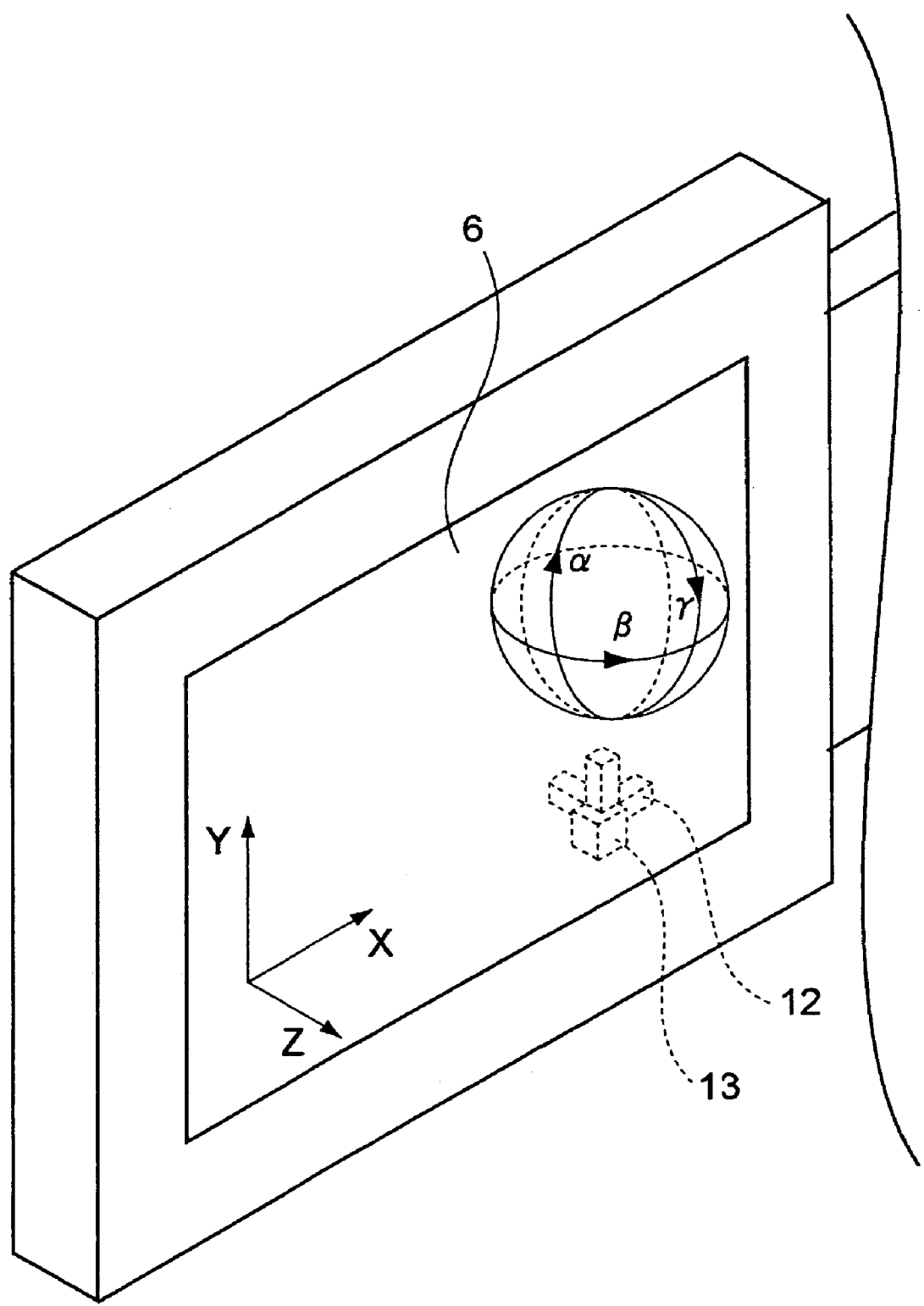
FIG. 6 is a perspective view showing a portion of the display device according to the embodiment.

FIGS. 3A and 3B illustrate the angular velocity sensor. FIGS. 4A and 4B are graphs that plot the results output from the angular velocity sensor. FIG. 5 illustrates the acceleration sensor. FIG. 6 shows the position at which the angular velocity sensor and the acceleration sensor are to be mounted.

The angular velocity sensor 12 is a device that detects the rotational angular velocity of the display device 1, and that outputs the result as a voltage. The angular velocity sensor 12 is shaped into, for example, a rectangular cylinder whose length parallel to the movement detection direction is 1 cm and whose lengths perpendicular thereto are 0.5 cm and 0.3 cm.

The motion of human arm is close to a spherical motion around the elbow or shoulder. As shown in FIG. 3A, when a user moves the display device 1, the display device 1 moves in the direction α along a sphere around a pivot point at, for example, an elbow 28. In order to detect the velocity of the arm movement, it is only required to detect the velocity of spherical motion, i.e., the angular velocity, of the arm. In general, the relation between acceleration and velocity is given by Eq. 1 as follows:

$$\text{acceleration} \alpha = \frac{\text{velocity} V}{dt}, \text{velocity} V = \sum_{i=0}^{t} \alpha i \text{ (acceleration)} \qquad \text{Eq. 1}$$

As is found from Eq. 1, an acceleration detecting device, for example, an acceleration sensor or the like, described below, can determine the velocity by integrating the data obtained at a given time width t. Once the movement velocity of the display device 1 for a constant period of time is determined, the moving distance is further determined by integrating the value of the determined velocity. The amount of scrolling on the screen is therefore determined.

However, a double integral by means of time needs to be calculated in order to determine the moving distance of the display device 1 from the acceleration, possibly resulting in response delay or accumulated error. As described above, it is only required to detect the angular velocity in order to detect the arm movement. In the present invention, therefore, the angular velocity sensor 12 is used as means for detecting the amount of movement.

The amount of scrolling on the screen is given by Eq. 2 using the angular velocity:

$$\text{scrolling amount } L = \sum_{i=0}^{t} \omega i (\text{angular velocity}) \qquad \text{Eq. 2}$$

The angular velocity sensor 12 is primarily used to detect vibration caused by the shaking of the hand holding electronic equipment. The vibration caused by shaking exhibits short-wavelength high-frequency variations. When the vibration caused by shaking is to be detected, for example, a high-pass filter or the like is used to remove the low-frequency variations to output only the high-frequency variations. The temperature drift outputs low-frequency variations, and such variations are thus removed. Therefore, in detecting the vibration caused by shaking, the failure issue due to the temperature drift does not occur.

The detection operation of the angular velocity sensor 12 corresponds to the user operation of moving the display device 1 while visually monitoring the displaying unit 6, and exhibits low-frequency variations of long wavelength. The operation of moving the display device 1 is correlated to low-frequency variations due to the temperature drift.

The output of the angular velocity sensor 12 of the display device 1 in the stationary state at a given temperature is stored in advance. For example, the output of the angular velocity sensor 12 of the display device 1 in the stationary state at a different temperature is detected. The detected output is compared to the previously stored output of the angular velocity sensor 12, and the difference in the reference value that changes due to the temperature drift is extracted. The output of the angular velocity sensor 12 in a moving state of the device equals the sum of the output as a result of the movement and the output as a result of the temperature drift. The extracted difference in the reference value is equivalent to the output as a result of the temperature drift. Therefore, by removing the extracted difference in the reference value from the output of the angular velocity sensor 12 in the moving state of the display device 1, only the output as a result of the movement can be determined. Where the angular velocity for the drift is indicated by $\Delta\omega k$, the amount of scrolling after the correction is given by Eq. 3 as follows:

$$\text{compensated scrolling amount } L = \sum_{i=0}^{t} \{\omega i - \Delta\omega k\} \quad \text{Eq. 3}$$

The angular velocity sensor 12 detects the rotational angular velocity in the direction $\alpha$, and outputs the result as a voltage. The output is represented by a change from a reference voltage. For example, when a user whose arm is 45 cm long rotates the display device 1 at a rotational angle of 5° for 0.2 seconds, the displacement voltage of the angular velocity sensor 12 is about 10 mV. The reference voltage of the angular velocity sensor 12 is about 1.5 V. The output angular velocity value passes through, for example, a low-pass filter (not shown) to remove the high-frequency components. The output with the high-frequency components removed undergoes time integration using numerical integration by the CPU 15 to determine the displacement component of the display device 1.

The angular velocity sensor 12 detects the angular velocity in only one rotation direction. Thus, in order to detect the motion across more than one rotation direction, for example, two directions shown in FIG. 3B, i.e., the directions $\alpha$ and $\beta$, the angular velocity sensor 12 must be positioned in conformity to each rotational axis. In this case, the angular velocity sensor 12 outputs the $\alpha$-direction component and the $\beta$-direction component of the angular velocity applied to the display device 1. The output results pass through the low-pass filter 29, and then undergo time integration using numerical integration by the CPU 15 to determine the displacement components of the display device 1, respectively.

The result of detection by the angular velocity sensor 12 is shown in, for example, FIG. 4A. In the graph shown in FIG. 4A, the y-axis designates the output voltage (V) of the angular velocity sensor 12, and the x-axis designates time (second). This output waveform includes a component related to the movement of the display device, which is detected by the angular velocity sensor 12, a component related to vibration caused by shaking or the like, and a component related to the temperature drift of the angular velocity sensor 12. The result whose high-frequency component, which is a shaking component, has been removed by the low-pass filter 29 is shown in FIG. 4B. This waveform includes only the component related to the movement of the display device, which is detected by the angular velocity sensor 12, and the component related to the temperature drift of the angular velocity sensor 12. The display device 1 causes the image to be scrolled according to the output voltage value of the angular velocity sensor 12. The output voltage exhibits the low-frequency variations, and therefore a small change of the voltage due to shaking or the like shown in FIG. 4A, i.e., high-frequency variations, need not be detected. If such a small change is processed as it is, the image can blur during scrolling, thus making it very difficult for a user to view. This is the reason why the unwanted high-frequency variations are removed using the low-pass filter 29.

The acceleration sensor 13 is a device that detects the acceleration in two or three axial directions when a user moves the display device 1 in a space while holding it in his/her hand, and that outputs the result as a voltage.

FIG. 5 shows that the acceleration sensor is used as, for example, a sensor for detecting the acceleration in three axial directions. The vertical component, horizontal component, and forward-backward component of the acceleration applied to the display device 1 are detected, and time integration is performed for each component to determine the velocity component and the displacement component.

When the display device 1 is in the stationary state, no acceleration is applied to the display device 1, and the output voltage of the acceleration sensor 13 becomes the voltage under no acceleration. In other words, the displacement of the output voltage of the acceleration sensor 13 per unit of time is zero. Thus, by determining that the output from the acceleration sensor 13 becomes the voltage under no acceleration (the displacement of the output voltage per unit of time is zero), the stationary state of the display device 1 can be detected. Thus, no additional sensor is required for detecting the stationary state, and the complexity of a processing system does not increase, resulting in efficient processing.

The calculation results of the angular velocity sensor 12 and the acceleration sensor 13 are used for compensation for the temperature drift and are also used for image scrolling, as described below.

As shown in FIG. 6, the display unit 6 includes a rear cover 6a, a frame 6b, a front cover 6c, a liquid crystal device 6d, the angular velocity sensor 12, and the acceleration sensor 13. The angular velocity sensor 12 includes three angular velocity sensors, that is, an angular velocity sensor 12a for detecting the movement in the X-direction, an angular velocity sensor 12b for detecting the movement in the Y-direction, and an angular velocity sensor 12c for detecting the movement in the Z-direction. The angular velocity sensors 12a and 12b are bonded to the inside of the rear cover 6a. The angular velocity sensor 12c is bonded to the outside of the frame 6b. The angular velocity sensor 12 is shaped into a rectangular cylinder whose longitudinal length is 1 cm. The angular velocity sensor 12c is disposed so that the longitudinal direction thereof is in parallel to the thickness direction of the display unit 6. If the angular velocity sensor 12c is disposed inside the display unit 6, the thickness of the display unit 6 can increase. The angular velocity sensor 12c is thus disposed outside the frame 6b.

A single acceleration sensor 13 is disposed. The single acceleration sensor 13 is sufficient to detect the movement in the X, Y, and Z axial directions. The acceleration sensor 13 is preferably close to the angular velocity sensor 12a and the angular velocity sensor 12b, but may be spaced apart therefrom. The angular velocity sensor 12 and the acceleration sensor 13 are connected with the CPU 15 via the low-pass filter 29 and the A/D converter 27.

(Processing Steps)

A process for scrolling the screen will now be described with reference to FIGS. 7 and 8.

Figure 7:
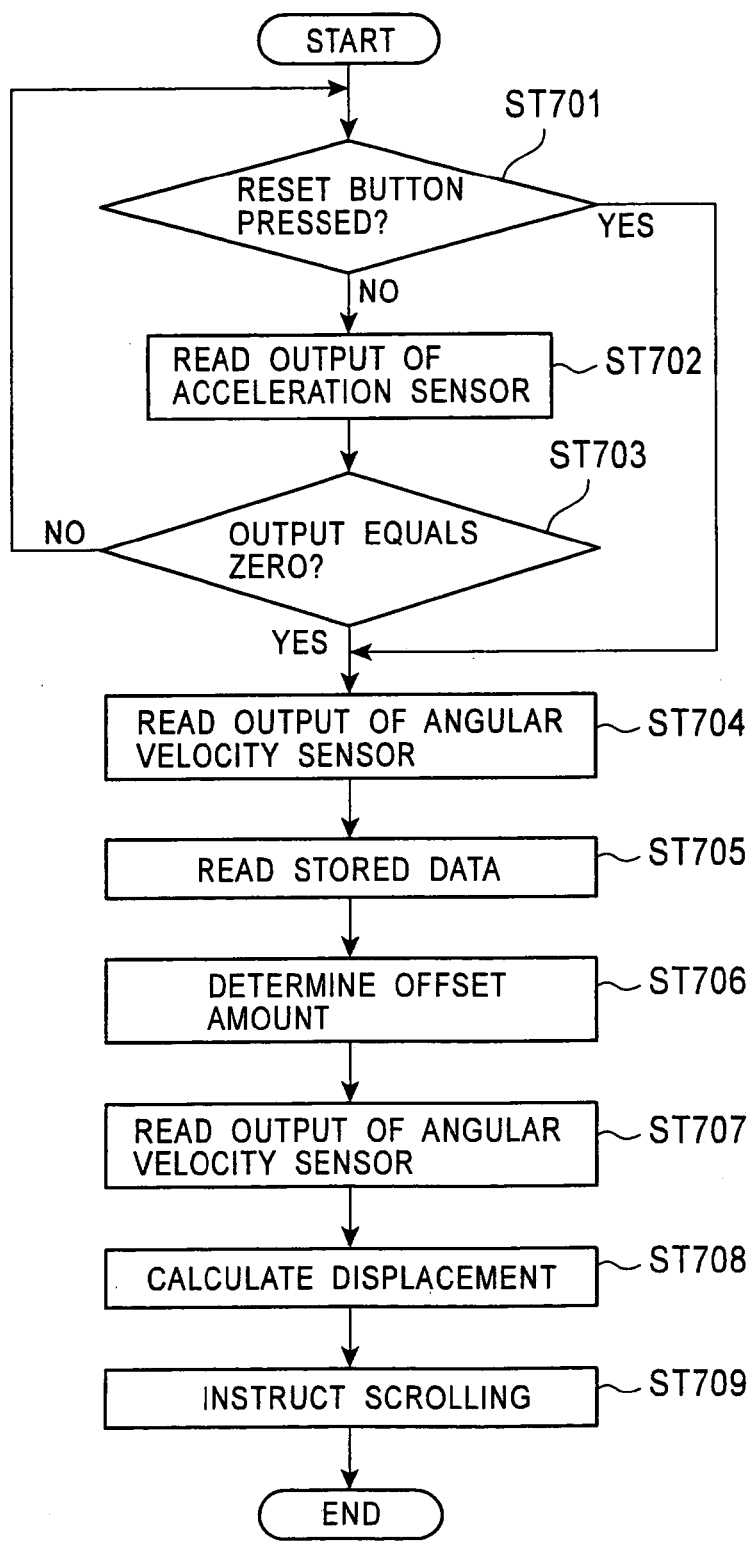
FIG. 7 is a flowchart showing the operation of temperature-drift compensation.

FIG. 7 shows processing steps of the CPU 15 until the screen is scrolled after the display device 1 moves. FIG. 8 shows the temperature drift of the angular velocity sensor 12, where the y-axis designates the voltage (V) and the x-axis designates the temperature (° C.).

As shown in FIG. 7, first, the CPU 15 determines whether or not the reset button 10 has been pressed by a user (step 701). If the reset button 10 has been pressed, then, the process proceeds to step 704 with steps 702 and 703 omitted. If the reset button 10 has not been pressed, the output voltage of the acceleration sensor 13 is read (step 702). Then, the acceleration sensor 12 detects the acceleration in order to determine whether or not the display device 1 is in the stationary state. If the output of the acceleration sensor 13 is zero, then the process proceeds to the next step, and, if the output is not zero, the processing of steps 701 and 2 is repeated (step 703).

If the reset button has been pressed by the user, or if the displacement of the output voltage of the acceleration sensor 13 is zero, the CPU 15 reads the output voltage of the angular velocity sensor 12 (step 704). Then, the CPU 15 reads the output voltage of the angular velocity sensor 12 in the stationary state at a given temperature, which has been stored in the flash memory 17 (step 705), and the value obtained by subtracting the value of the output voltage of the angular velocity sensor 12, which is read in step 705, from the value of the output voltage of the angular velocity sensor 12, which is read in step 704, is extracted as the amount of offset due to the temperature drift (step 706).

Then, for example, the value output from the angular velocity sensor 12 when the user moves the display device 1 is read (step 707). By subtracting the amount of offset extracted in step 706 from this output value, the change of the voltage caused by the temperature drift is removed, and the displacement as a result of the movement is thus determined (step 708). An image scrolling instruction based on this value is sent (step 709).

With such processing, a failure due to the temperature drift is overcome.

The principle of the processing steps described above will be described in the context of movement in one direction, by way of example.

Figure 8:
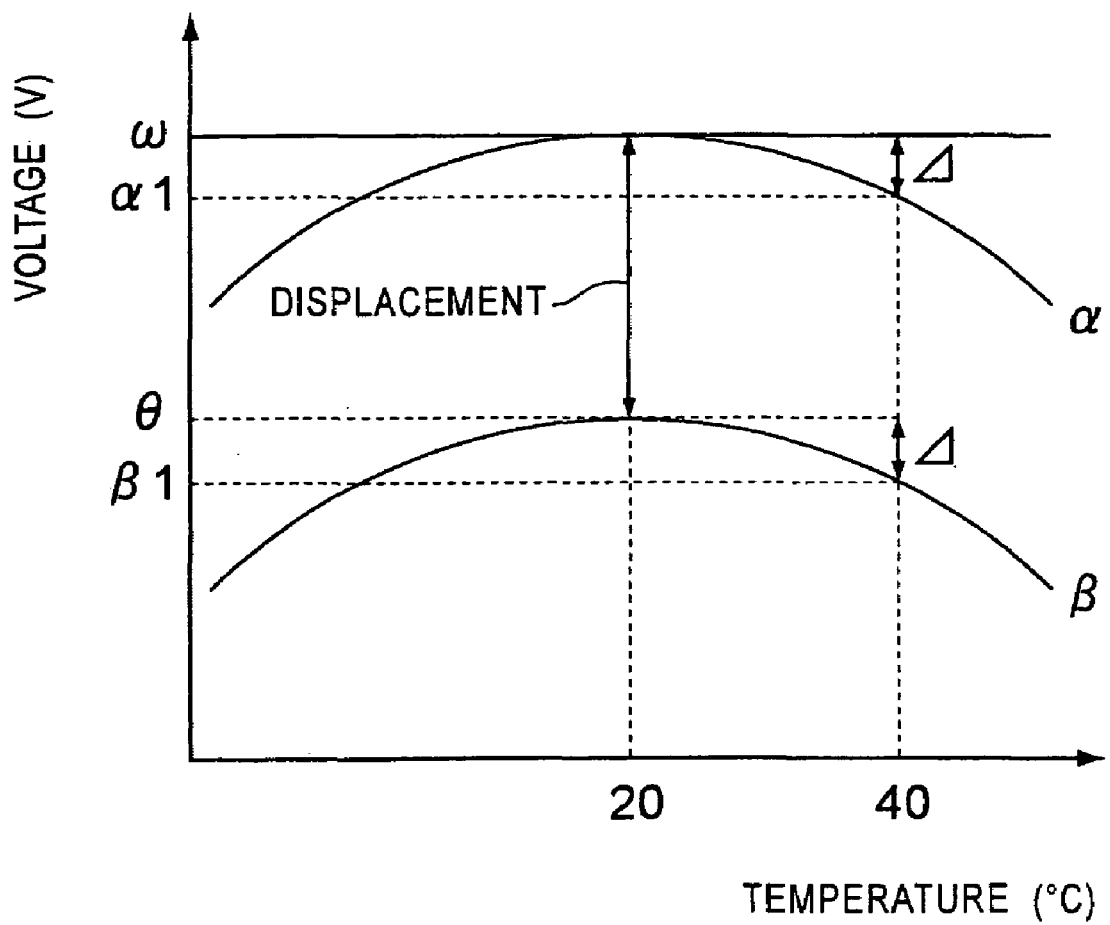
FIG. 8 is a diagram showing the principle of temperature-drift compensation.

The angular velocity sensor 12 exhibits an output indicated by a curve β shown in FIG. 8 when the temperature changes in the stationary state. A curve α represents the output value when the angular velocity sensor 12 is moved a certain amount. The curve α is shifted in parallel from the curve β in the forward direction of the voltage axis. For example, an output value θ at 20° C. is stored in the flash memory 17 or the like.

For example, the case at 40° C. is taken as example. The output of the angular velocity sensor 12 in the stationary state at 40° C. is β1. The calculation of step 706 is performed. The value θ stored in the flash memory 17 is read, and the difference between β1 and θ is determined to extract the amount of offset due to the temperature drift. Where the amount of offset is indicated by Δ, the following equation is given:

$$\Delta = \theta - \beta 1$$

The output value at 40° C. when the user moves the display device 1 a certain amount is α1. The calculation of step 707 is performed, and Δ is added to α1 to determine the compensated output. Where the compensated output is indicated by ω, the following equation is given:

$$\omega = \alpha 1 + \Delta$$
$$= \alpha 1 + (\theta - \beta 1)$$
$$= \alpha 1 - \beta 1 + \theta$$

Thus, the compensated output ω is constant irrespective of the temperature. The value of θ stored in the flash memory 17 is subtracted from ω, thereby determining (α1−β1). This is the displacement caused by the actual movement. Therefore, the image is scrolled based on the value of (α1−β1).

That is, actually, once the display device 1 stores the curve β1 for the stationary state, when the user actually uses the display device 1, the difference between the output voltage at a given temperature when the display device 1 is moved a certain amount (the output voltage in the curve α1 at a given temperature) and the output voltage in the curve β1 at this temperature is determined to detect the displacement as a result of only the movement of the display device 1. The curve α1 may be stored by default at the shipping time of the display device 1.

(Use Example)

The operation for purchasing content using the display device 1 will now be described.

Figure 9:
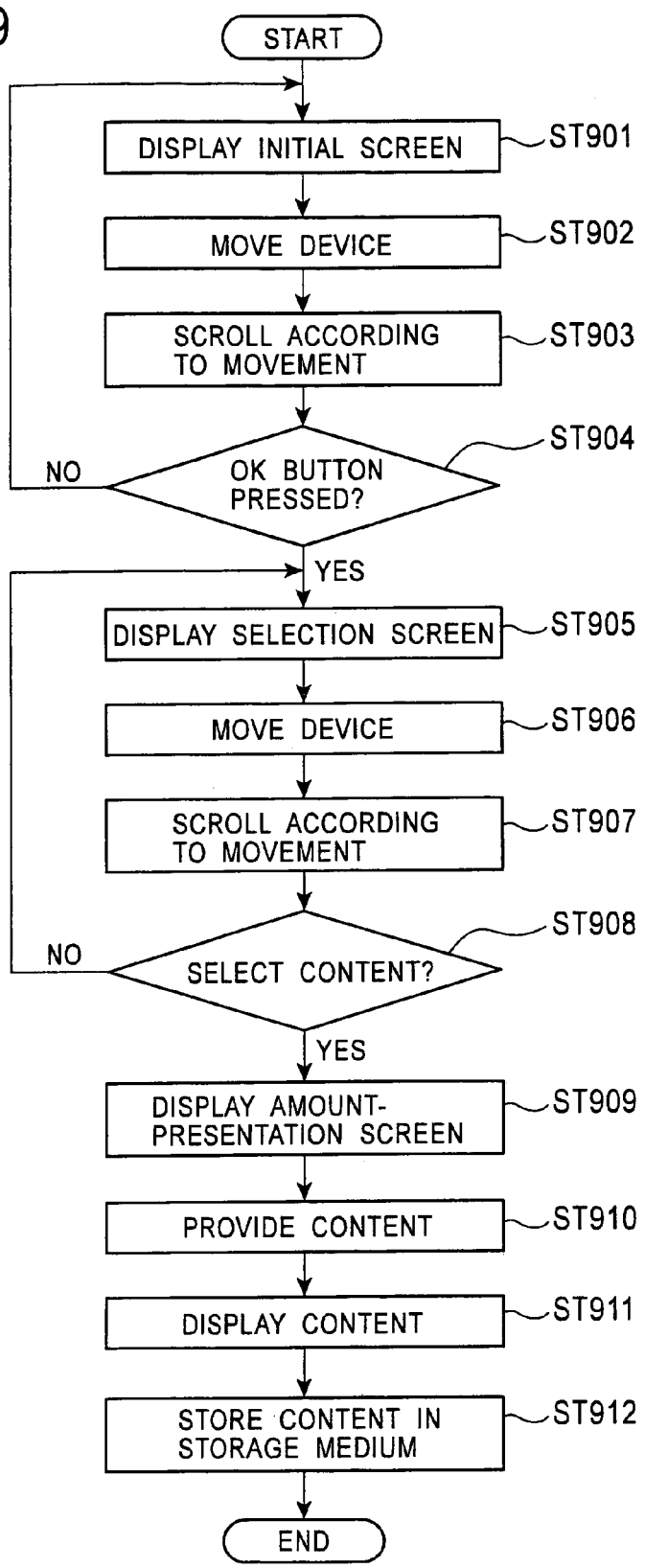
FIG. 9 is a flowchart showing the operation of the display device.

FIG. 9 is a flowchart showing this operation.

Figure 10:
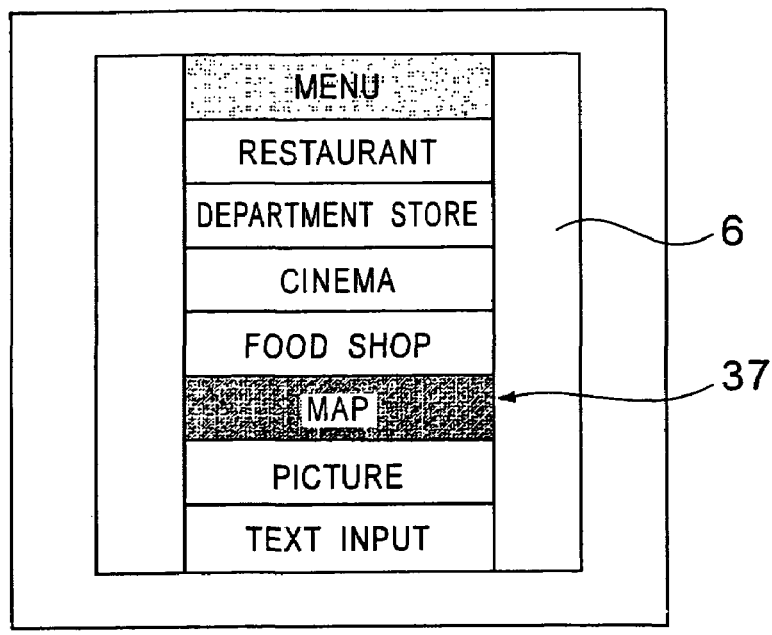
FIG. 10 is a view showing an example initial screen displayed on the display device.

The display device 1 shows the initial screen on the display unit 6 upon power on (step 901). FIG. 10 is an illustration of an example of the initial screen. On the screen of the display unit 6 shown in FIG. 10, for example, "menu", "restaurant", "department store", "cinema", "food shop", "map", "picture", "text input", and so on are shown. Although not shown on this screen, other items underlie them, and the hidden items are to be viewed by moving down the display device 1 to scroll down the screen. A currently selectable item on the screen is highlighted (indicated by reference numeral 37 shown in FIG. 10), and the highlighted item 37 is selected when the OK button 7a is pressed. Such highlight is, for example, fixed on the screen. The screen is scrolled to move the items in the manner described above, thereby selecting the item 37 to be highlighted.

When the display device 1 is moved up and down (step 1102), in response to this movement, the display device 1 scrolls, for example, up and down the screen of the display unit 6 (step 1103). When a desired item, for example, "picture", is highlighted by the user and the OK button 7a is pressed (step 904), the selection screen for "picture" is displayed on the display unit 6 (step 905).

Figure 11:
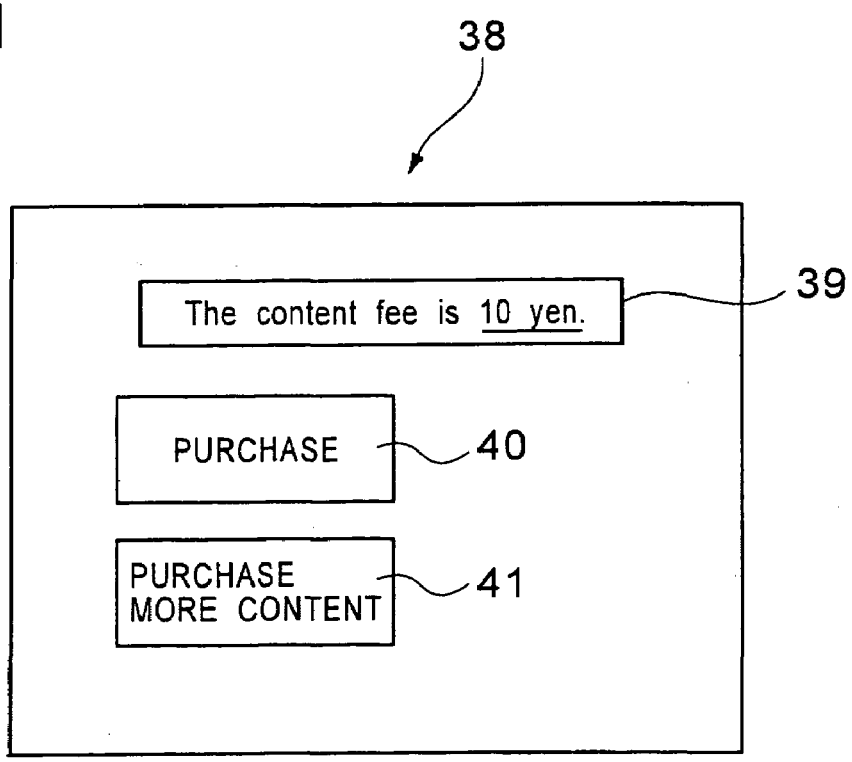
FIG. 11 is a view showing an example amount-presentation screen displayed on the display device.

Also, when the display device 1 is moved up, down, right, and left (step 906), in response to this movement, the display device 1 scrolls the screen of the display unit 6, for example, up, down, right, and left (step 907). When the user selects one image from four divided content images available A1, A2, B1, and B2 (step 908), as shown in FIG. 11, the display device 1 shows an amount-presentation screen 38 on the display unit 6 (step 909). The screen 38 contains, for example, an amount display section 39 for displaying the fee of the content, a purchase confirmation button 40, and multiple-content purchase button 41. When the multiple-content purchase button 41 is pressed, the user returns to the initial screen to add the content to be further purchased.

In the selection described above, for example, the largest image of the four images A1, A2, B1, and B2 on the display screen may be highlighted, and an appropriate highlight screen may be selected by scrolling, thereby selecting content using the OK button 7a.

When the user selects content upon presentation of the content fee, the selected content is provided to the display device 1, for example, from a server via the Internet (step 910).

Figure 12:
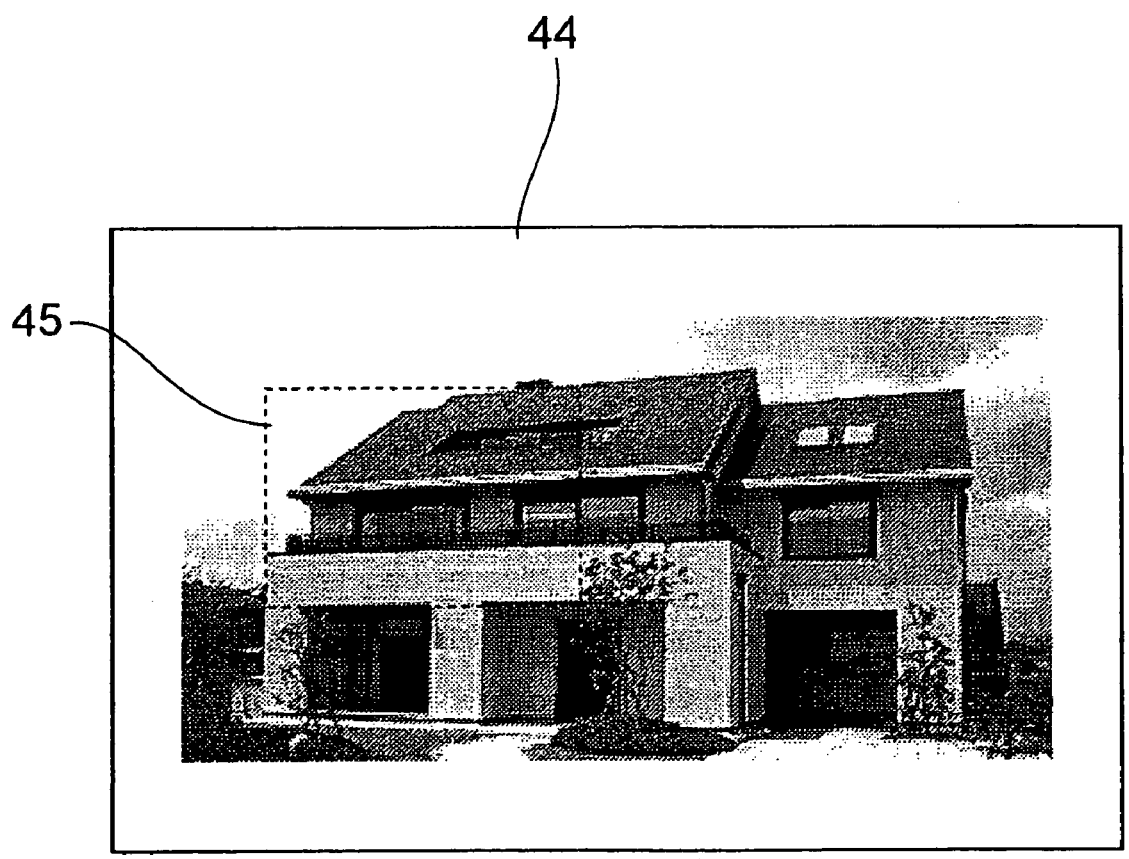
FIG. 12 is a view showing an example content image displayed on the display device.

The display device 1 displays content 44 on the display unit 6 in the manner shown in, for example, FIG. 12 (step 911), and stores the content 44 in the storage medium (step 912).

The user moves the display device 1 as desired, and is thus allowed to view an image 45 of the content 44 displayed on the display unit 6, while scrolling the image 45.

Figure 13:
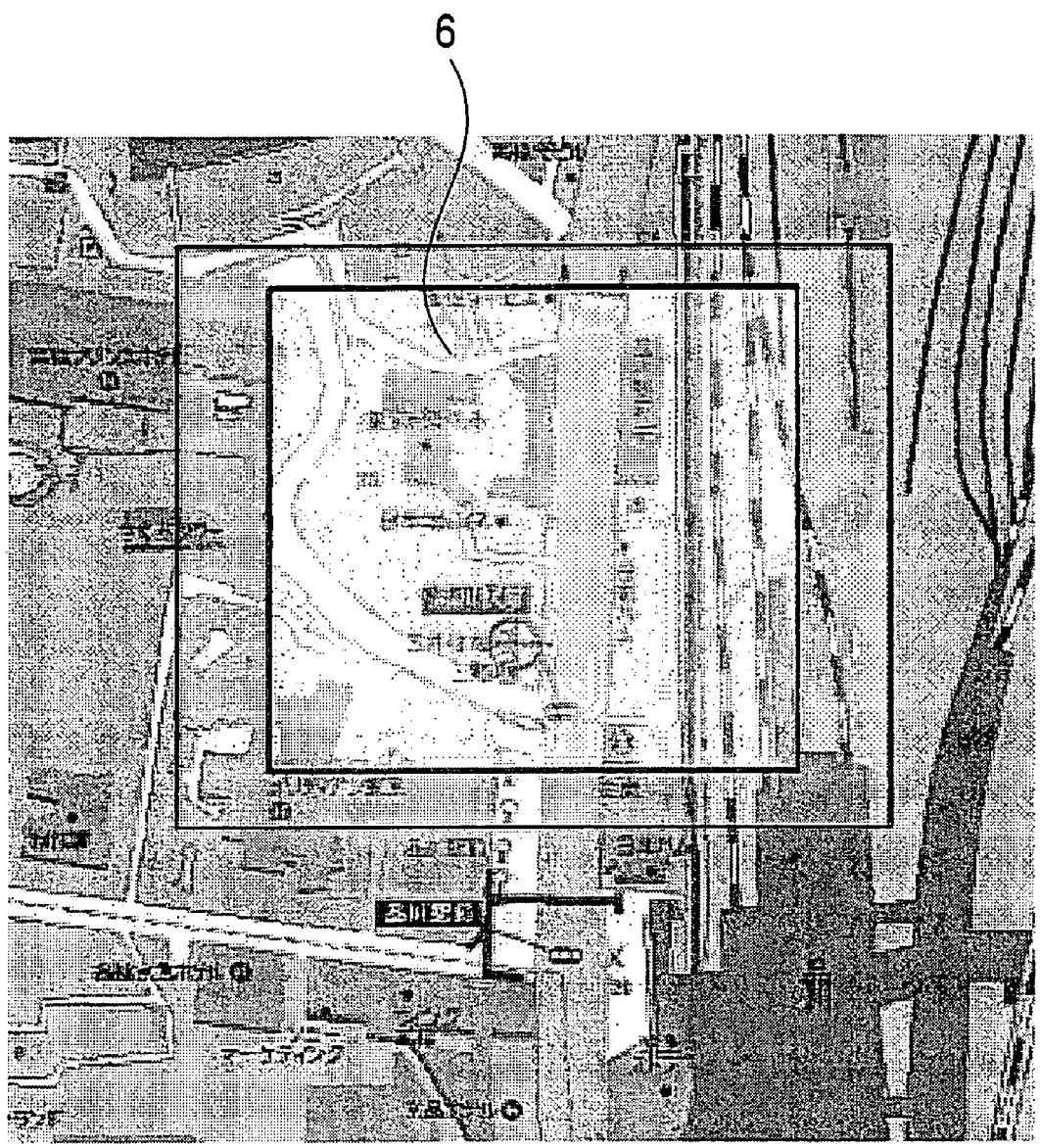
FIG. 13 is a view showing another example content image displayed on the display device.

FIG. 13 illustrates an example image that is to be displayed on the display unit 6 when "map" is selected from the items on the initial screen shown in FIG. 10. In this state, when the display device 1 is moved (step 906) to scroll the screen, for example, up, down, right, and left (step 907), and a predetermined image on the map is selected (step 908), for example, more detailed map in this area is shown as the selected content on the display unit 6, and is stored in the storage medium 8.

During this operation, the failure issue that an image is scrolled due to the temperature drift of the angular velocity sensor 12 even when the display device 1 is in the stationary state does not occur.

Also, a user can press the reset button 10 to compensate for the temperature drift of the angular velocity sensor 12. This prevents a failure.

The angular velocity sensor detects the amount of movement of the device. This allows for detection of the amount of movement of the device without an influence of the acceleration of gravity.

The present invention is not limited to the foregoing embodiment.

In the foregoing embodiment, the content is an image, by way of example; however, the content may be music, etc.

For example, a stop button (not shown) may be disposed for preventing image scrolling when a user does not desire to scroll the image displayed on the display unit 6 while he/she moves the display device 1.

While the embodiment has been described in the context of a display device, by way of example, the present invention is applicable to any device using an angular velocity sensor.

INDUSTRIAL APPLICABILITY

As described above, according to the present invention, an angular velocity sensor is used to detect the amount of movement of a device, and an acceleration sensor is used to detect a stationary state of the device. This allows for detection of the amount of movement of the device without an influence of the acceleration of gravity. Moreover, this prevents a failure caused by the temperature drift of the angular velocity sensor.

The invention claimed is:

1. An electronic device, comprising:
an angular velocity sensor that outputs a first signal in accordance with a rotational angular velocity of the electronic device;
means for storing in advance data of a second signal normally output by the angular velocity sensor at a predetermined temperature when the angular velocity sensor is in a stationary state;
means for detecting the stationary state of the angular velocity sensor;
means for extracting as a difference signal the difference between the first signal and the second signal;
means for adjusting the first signal based on the extracted difference signal; and
a display unit that scrolls and displays an image based on the adjusted signal.

2. An electronic device according to claim 1, wherein the stationary-state detecting means comprises an acceleration sensor that is used to detect a velocity component and a displacement component in a predetermined movement direction of the electronic device.

3. An electronic device, comprising:
an angular velocity sensor that outputs a first signal in accordance with a rotational angular velocity of the electronic device;
means for storing in advance data of a second signal normally output by the angular velocity sensor at a predetermined temperature when the angular velocity sensor is in a stationary state;
a button;
means for extracting as a difference signal the difference between the first signal and the second signal when the button is pressed;
means for adjusting the first signal based on the extracted difference signal; and
a display unit that scrolls and displays an image based on the adjusted signal.

4. A signal compensation device, comprising:
an angular velocity sensor that outputs a first signal in accordance with a rotational angular velocity of the device;
means for storing in advance a second signal normally output by the angular velocity sensor at a predetermined temperature when the angular velocity sensor is in a stationary state;
means for detecting the stationary state of the angular velocity sensor;
means for extracting as a difference signal the difference between the first signal and the second signal; and
means for adjusting the first signal based on the extracted difference signal.

5. A signal compensation device, comprising:
an angular velocity sensor that outputs a first signal in accordance with a rotational angular velocity of the device;
means for storing in advance data of a second signal normally output by the angular velocity sensor at a predetermined temperature when the angular velocity sensor is in a stationary state;
a button;
means for extracting as a difference signal the difference between the first signal and the second signal when the button is pressed; and
means for adjusting the first signal based on the extracted difference signal.

6. A signal compensation method, comprising:
   detecting a stationary state;
   reading a first signal output from an angular velocity sensor;
   reading data of a second signal from a storage device, the data of the second signal being normally output by the angular velocity sensor at a predetermined temperature when the angular velocity sensor is in a stationary state;
   extracting as a difference signal the difference between the read first signal and the second signal; and
   adjusting the first signal based on the extracted difference signal.

7. An electronic device, comprising:
   an angular velocity sensor that outputs a first signal in accordance with a rotational angular velocity of the electronic device;
   a storage unit operable to store in advance data of a second signal normally output by the angular velocity sensor at a predetermined temperature when the angular velocity sensor is in a stationary state;
   a detector operable to detect the stationary state of the angular velocity sensor;
   an extracting unit operable to extract as a difference signal the difference between the first signal and the second signal; and
   a compensating unit operable to adjust the first signal based on the extracted difference signal.

8. An electronic device according to claim 7, further comprising a display unit that scrolls and displays an image based on the adjusted signal.

* * * * *